(12) United States Patent
Aga et al.

(10) Patent No.: US 9,456,338 B2
(45) Date of Patent: Sep. 27, 2016

(54) CONTROL APPARATUS AND WIRELESS COMMUNICATION SYSTEM

(75) Inventors: Toshiyuki Aga, Nagoya (JP); Koichi Masuda, Obu (JP)

(73) Assignee: DENSO CORPORATION, Kariya (JP)

(*) Notice: Subject to any disclaimer, the term of this patent is extended or adjusted under 35 U.S.C. 154(b) by 245 days.

(21) Appl. No.: 14/349,083

(22) PCT Filed: Jul. 3, 2012

(86) PCT No.: PCT/JP2012/004284
§ 371 (c)(1),
(2), (4) Date: Apr. 2, 2014

(87) PCT Pub. No.: WO2013/054456
PCT Pub. Date: Apr. 18, 2013

(65) Prior Publication Data
US 2014/0242973 A1 Aug. 28, 2014

(30) Foreign Application Priority Data
Oct. 11, 2011 (JP) ................................. 2011-224190

(51) Int. Cl.
*H04W 8/22* (2009.01)
*H04M 1/725* (2006.01)
*G08C 17/02* (2006.01)
*H04M 1/60* (2006.01)

(52) U.S. Cl.
CPC ............... *H04W 8/22* (2013.01); *G08C 17/02* (2013.01); *H04M 1/72533* (2013.01); *G08C 2201/20* (2013.01); *G08C 2201/93* (2013.01); *H04M 1/6075* (2013.01); *H04M 2250/02* (2013.01); *H04M 2250/04* (2013.01)

(58) Field of Classification Search
CPC ... H04W 8/22; G08C 17/02; G08C 2201/20; G08C 2201/93; H04M 1/72533; H04M 2250/02; H04M 2250/04; H04M 1/6075
USPC .................. 455/418–420, 41.2, 41.3; 701/2; 340/5.61, 908
See application file for complete search history.

(56) References Cited

U.S. PATENT DOCUMENTS

2003/0156097 A1 8/2003 Kakihara et al.
2010/0138149 A1* 6/2010 Ohta .................... G01C 21/26 701/533
2011/0105097 A1* 5/2011 Tadayon ................ H04M 3/53 455/418

FOREIGN PATENT DOCUMENTS

JP 2010-127781 A 6/2010

OTHER PUBLICATIONS

Noriyuki Kitamura, "To remotely manipulate a plurality of PCs using MultiVNC", [online], Feb. 9, 2006, IT Media Inc., [search date Sep. 10, 2012] Internet <URL:http://www.atmarkit.co.jp/flinux/rensai/linuxtips/845usemultivnc.html>.
Office Action mailed Feb. 12, 2014 in the corresponding JP patent application No. 2011-224190 (and English translation).
International Search Report and Written Opinion of the International Searching Authority mailed Sep. 18, 2012 for the corresponding international application No. PCT/JP2012/004284 (and English translation).

* cited by examiner

*Primary Examiner* — Vladimir Magloire
*Assistant Examiner* — Erica Navar
(74) *Attorney, Agent, or Firm* — Posz Law Group, PLC (57) ABSTRACT

A smart phone carried by a user being aboard a vehicle transmits an automatic Virtual Network Computing (VNC) request that is a request of a remote manipulation based on a trigger event that arises when a short range wireless communication is established with an in-vehicle apparatus in the vehicle. Further, the smart phone transmits a manual VNC request at the time when a manipulation for a VNC request is performed by a user. In contrast, the in-vehicle apparatus uses, as a start condition of starting a VNC connection, a reception of the automatic VNC request from a smart phone that is registered as a target of remote manipulation. In particular, when a plurality of smart phones are registered, the in-vehicle apparatus adds a reception of the manual VNC request from a smart phone into the start condition.

12 Claims, 3 Drawing Sheets

CONTROL APPARATUS AND WIRELESS COMMUNICATION SYSTEM

CROSS REFERENCE TO RELATED APPLICATION

The present disclosure is a U.S. national stage application of PCT/JP2012/004284 filed on Jul. 3, 2012, and is based on Japanese Patent Application No. 2011-224190 filed on Oct. 11, 2011, the disclosures of which are incorporated herein by reference.

TECHNICAL FIELD

The present disclosure relates to a technology for an in-vehicle apparatus to remotely manipulate a portable apparatus.

BACKGROUND ART

As represented by a smart phone (multifunctional mobile phone), a portable apparatus in recent years provides various functions; for example, some portable apparatuses are known to provide navigation functions equivalent to an in-vehicle navigation apparatus. It is noted that the size of a display screen of such a portable apparatus is typically smaller than that of an in-vehicle display apparatus mounted in a vehicle; thus, the display screen of the portable apparatus has been difficult to see or manipulate in the vehicle, as compared with that of the in-vehicle apparatus.

Such a background leads to a proposal of a technology which configures an in-vehicle apparatus and a portable apparatus to communicate with each other for cooperation to thereby make available functions of the portable apparatus in the in-vehicle apparatus. This technology permits the in-vehicle display apparatus to display an image displayed in the display portion of the portable apparatus while reflecting a manipulation performed in the in-vehicle apparatus to the portable apparatus. That is, the portable apparatus is remotely manipulated by the in-vehicle apparatus; thereby, the functions of the portable apparatus is used in the in-vehicle apparatus.

In particular, some portable apparatuses using a short range wireless communication such as Bluetooth (registered trademark) are in widespread use in recent years. The portable apparatus and the in-vehicle apparatus thus interface with each other even without being intentionally connected with each other using a cable.

For example, the in-vehicle apparatus in Patent Literature 1 establishes a wireless communication with a portable apparatus that is located at a distance permitting a short range wireless communication and thereby detected; then acquires an image and a sound provided by an application under execution in the portable apparatus; and then displays the acquired image in a touch-sensitive display apparatus mounted in the vehicle while outputting the sound from a speaker. Upon receiving a touch manipulation to the displayed image, the in-vehicle apparatus transmits the received manipulation to the portable apparatus and causes the portable apparatus to execute the process corresponding to the manipulation.

It is noted that remotely manipulating a portable apparatus from an in-vehicle apparatus via a wireless communication results in necessitating the selection of a portable apparatus serving as a target of remote manipulation among a plurality of portable apparatuses. In this regard, the in-vehicle apparatus described in Patent Literature 1 operates as follows.

That is, when a plurality of portable apparatuses are detected which exist in a distance enabling a short range wireless communication, a list inquiring about with which portable apparatus the in-vehicle apparatus is caused to interface is displayed in the display apparatus of the in-vehicle apparatus, thereby requiring a user to select.

PRIOR ART LITERATURES

Patent Literature

Patent Literature 1: JP 2010-130669 A

SUMMARY OF INVENTION

Under the configuration which selects a portable apparatus serving as a target of remote manipulation depending on a manipulation in the in-vehicle apparatus as described in Patent Literature 1, the user uses an own portable apparatus the user holds as a target of remote manipulation. Thus, the user bothers selecting the own portable apparatus from a plurality of candidates of portable apparatuses by finding out the information indicating the own portable apparatus.

It is an object of the present disclosure to provide a technology determining efficiently a portable apparatus serving as a target of remote manipulation.

According to an aspect of the present disclosure, a control apparatus is provided as follows. The control apparatus performs, in an in-vehicle apparatus, a remote manipulation process to remotely manipulate at least one terminal being portable. The in-vehicle apparatus includes an in-vehicle display portion to display an image, an in-vehicle input portion to receive a manipulation, and an in-vehicle wireless communication portion to perform a wireless communication with the at least one terminal. The control apparatus includes an execution section that performs, as the remote manipulation process, an image display process and a manipulation output process. The image display process is a process that receives an image displayed in a display portion of the at least one terminal via the in-vehicle wireless communication portion and displays the received image in the in-vehicle display portion. The manipulation output process is a process that outputs a manipulation, which is received by the in-vehicle input portion, to the at least one terminal via the in-vehicle wireless communication portion. The execution section defines, as a start condition of starting the remote manipulation process, a reception of a request of the remote manipulation process from a registered terminal, which is included in the at least one terminal and registered as a target of the remote manipulation process, via the in-vehicle wireless communication portion. Further, in cases that the at least one terminal includes more than one registered terminal that is registered as the target of the remote manipulation process, the execution section defines, as the start condition, a manipulation that requests the remote manipulation process in addition, wherein the manipulation is received by an input portion of one of the more than one registered terminal.

According to such a configuration, when a plurality of portable apparatuses each are registered as a registered portable apparatus, a registered portable apparatus which receives a manipulation that requests the remote manipulation process can be determined to be a target of the remote manipulation process. This leads to elimination of necessity of selecting from a plurality of candidates in a configuration where a registered portable apparatus that is a target of the remote manipulation process is selected by a manipulation to an in-vehicle apparatus. Thus, the portable apparatus serving as the target of the remote manipulation process can be determined efficiently. It is noted that under the above configuration "at least more than one" is equivalent to "one or more than one," and "more than one" is equivalent to "plurality."

According to another aspect of the present disclosure, a wireless communication system is provided as follows. The wireless communication system includes at least one terminal being portable, and an in-vehicle apparatus. The at least one terminal includes: a terminal display portion to display an image; a terminal input portion to receive a manipulation; a terminal wireless communication portion to perform a wireless communication with the in-vehicle apparatus; a first request section to transmit a first remote manipulation request via the terminal wireless communication portion to the in-vehicle apparatus; and a second request section to transmit a second remote manipulation request via the terminal wireless communication portion to the in-vehicle apparatus when a manipulation to request a remote manipulation is received by the terminal input portion. The in-vehicle apparatus includes: an in-vehicle display portion to display an image; an in-vehicle input portion to receive a manipulation; an in-vehicle wireless communication portion to perform a wireless communication with the at least one terminal; and an execution section that performs, as a remote manipulation process to remotely manipulate the at least one terminal, an image display process and a manipulation output process, wherein the image display process is a process, which receives an image displayed in the terminal display portion via the in-vehicle wireless communication portion and displays the received image in the in-vehicle display portion, while the manipulation output process is a process that outputs a manipulation, which is received by the in-vehicle input portion, to the at least one terminal via the in-vehicle wireless communication portion. The execution section defines, as a start condition of starting the remote manipulation process, a reception of the first remote manipulation request from a registered terminal via the in-vehicle wireless communication portion, wherein the registered terminal is included in the at least one terminal and registered as a target of the remote manipulation process. Further, in cases that the at least one terminal includes more than one registered terminal that is registered as a target of the remote manipulation process, the execution section defines, as the start condition, a reception of the second remote manipulation request in addition, wherein the reception of the second remote manipulation request is from one of the more than one registered terminal.

According to such a configuration, when a plurality of portable apparatuses each are registered as a registered portable apparatus, a registered portable apparatus which receives a manipulation that requests the remote manipulation process can be determined to be a target of the remote manipulation process. This leads to elimination of necessity of selecting from a plurality of candidates in a configuration where a registered portable apparatus that is a target of the remote manipulation process is selected by a manipulation to an in-vehicle apparatus. Thus, the portable apparatus serving as the target of the remote manipulation process can be determined efficiently.

BRIEF DESCRIPTION OF DRAWINGS

The above and other objects, features and advantages of the present disclosure will become more apparent from the following detailed description made with reference to the accompanying drawings as follows.

EMBODIMENTS FOR CARRYING OUT INVENTION

An embodiment to which the present disclosure apples is explained with reference to drawings.

1. Overall Configuration

Figure 1:
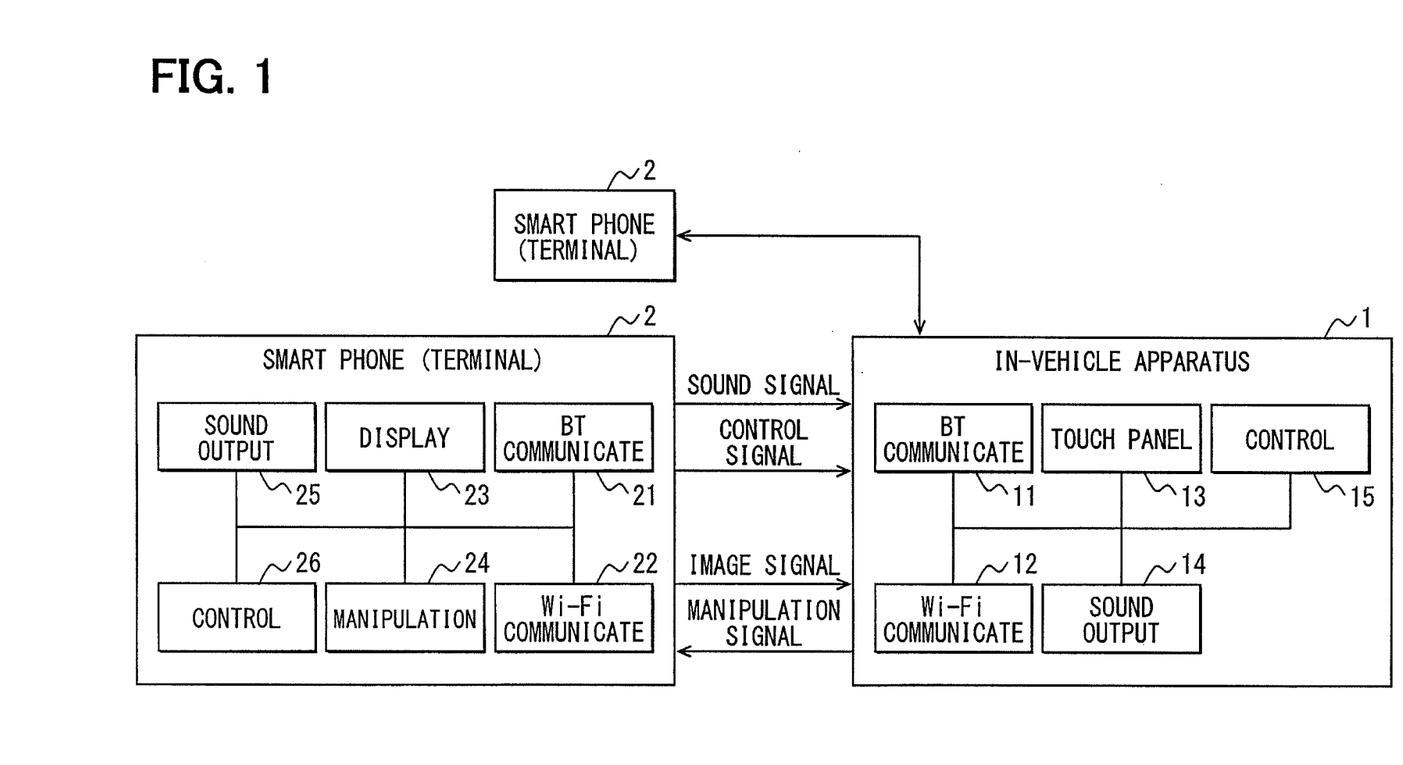
FIG. 1 is a block diagram illustrating a configuration of a wireless communication system according to an embodiment of the present disclosure.

FIG. 1 is a block diagram illustrating a configuration of a wireless communication system according to an embodiment. The wireless communication system includes an in-vehicle apparatus 1 mounted in a vehicle, and a smart phone 2 carried by a user who has gotten in the vehicle.

The in-vehicle apparatus 1 is an electronic apparatus with a navigation function, a music reproduction function, etc.; the in-vehicle apparatus includes a BT communication portion 11, a Wi-Fi communication portion 12, a touch panel display portion 13, a sound output portion 14, and a control portion 15.

The BT communication portion 11 includes a communication module for performing a short range wireless communication (hereinafter, also referred to as a "BT wireless communication") according to the Bluetooth (registered trademark) standard, providing a function to enable a BT wireless communication between the in-vehicle apparatus 1 and an external communication apparatus (for example, a smart phone 2). The BT communication portion 11 is designed to provide a communication area that covers an interior compartment of the vehicle.

The Wi-Fi communication portion 12 includes a communication module for performing a short range wireless communication (hereinafter also referred to as a "WF wireless communication") according to the Wi-Fi (registered trademark) standard, providing a function to enable a WF wireless communication between the in-vehicle apparatus 1 and an external communication apparatus (for example, a smart phone 2). Like the BT communication portion 11, the Wi-Fi communication portion 12 is designed to provide a communication area that covers an interior compartment of the vehicle.

The touch panel display portion 13 includes a touch-sensitive display apparatus, providing a function which displays an image on a display screen and a function which receives a manipulation by a user via a touch panel. The display screen of the touch panel display portion 13 is located in a position which a user (in particular, driver) who is aboard the vehicle can see. In addition, the sound output section 14 provides a function which outputs a sound via a speaker provided in the interior compartment of the vehicle.

The control portion 15 includes a known microcomputer having a CPU, ROM, RAM, I/O, and the like, providing a function which controls the BT communication portion 11, the Wi-Fi communication portion 12, the touch panel display portion 13, and the sound output portion 14, all of which are connected via a bus line.

In contrast, the smart phone 2 is a multifunctional mobile phone, including a BT communication portion 21, a Wi-Fi communication portion 22, a display portion 23, a manipulation portion 24, a sound output portion 25, and a control portion 26. It is noted that the smart phone 2 may be also referred to as a terminal that is portable.

The BT communication portion 21 includes a communication module for performing a BT wireless communication, providing a function to enable a BT wireless communication between the smart phone 2 and an external communication apparatus (for example, an in-vehicle apparatus 1).

The Wi-Fi communication portion 22 includes a communication module for performing a WF wireless communication, providing a function to enable a WF wireless communication between the smart phone 2 and an external communication apparatus (for example, an in-vehicle apparatus 1).

The display portion 23 provides a function which displays an image on a display screen. In addition, the manipulation portion 24 provides a function to receive a manipulation by a user. The manipulation portion 24 may be provided as a touch panel attached to a front face of the display screen of the display portion 23. In addition, the touch panel may be replaced with a hardware button (mechanical button) singly or in combination with a touch panel.

The sound output portion 25 provides a function which outputs a sound via a speaker.

The control portion 26 includes a known microcomputer having a CPU, ROM, RAM, I/O, and the like, providing a function which controls the BT communication portion 21, the Wi-Fi communication portion 22, the display portion 23, and the sound output portion 25, all of which are connected via a bus line.

2. Outline of Process

The following explains an outline of a process executed by a wireless communication system according to the present embodiment. In this wireless communication system, the in-vehicle apparatus 1 establishes a VNC (Virtual Network Computing) connection with a smart phone 2 carried by a user who is aboard the vehicle, executing a remote manipulation process that enables the in-vehicle apparatus 1 to remotely manipulate the smart phone 2. To be specific, the control portion 15 of the in-vehicle apparatus 1 receives an image signal indicating an image currently displayed in the display portion 23 of the smart phone 2 via the Wi-Fi communication portion 12, and executes an image display process that displays an image indicated by the received image signal on the touch panel display portion 13. Further, the control portion 15 receives a sound signal indicating a sound outputted via the sound output portion 25 of the smart phone 2 via the BT communication portion 11, and executes a sound output process that outputs a sound indicated by the received sound signal via the sound output portion 14. Furthermore, the control portion 15 outputs a manipulation signal, which indicates a manipulation received via the touch panel display portion 13, to the smart phone 2 via the BT communication portion 11, and executes a manipulation output process that causes the smart phone 2 to execute a process, which is executed when a manipulation indicated by the received manipulation signal is supposed to be inputted to the manipulation portion 24 of the smart phone 2. Such a remote manipulation process (image display process, sound output process, and manipulation output process) enables the in-vehicle apparatus 1 to remotely manipulate the smart phone 2 under the VNC connection being established; as a result, functions of the smart phone 2 can be used in the in-vehicle apparatus 1.

In addition, the VNC connection is started with a smart phone 2 that is registered as a target of remote manipulation process (candidate of VNC connection), on the premise that the BT wireless communication is under connection with the smart phone 2. That is, the user registers previously a smart phone 2, which is used for remote manipulation, with the in-vehicle apparatus 1. In this registration, a pairing setup for the BT wireless communication is performed. Thereafter, as long as the smart phone 2 is brought in the vehicle under the BT wireless communication being enabled, the in-vehicle apparatus 1 and the smart phone 2 automatically come to be under the communication connection with each other via the BT wireless communication.

Therefore, the start of the VNC connection can be started by a trigger event that arises when the communication connection is established between the in-vehicle apparatus 1 and the smart phone 2 (hereinafter "registered smart phone") that was registered in the in-vehicle apparatus 1. It is noted that when a plurality of smart phones 2 are registered simultaneously, it is necessary to select one smart phone 2 which should be a target of the VNC connection. Then, when a plurality of smart phones 2 are registered, a manipulation of a VNC request performed in the display portion 23 of the registered smart phone 2 is added to the necessary condition (start condition) for starting the VNC connection. Further, the manipulation of the VNC request is for an input of a declaration of user's binary intention whether to request or not; thus, the VNC connection can be achieved by a very easy manipulation (for example, a manipulation of tapping on a request button being currently displayed on the display portion 23 of the registered smart phone 2).

3. Procedure of Process

Figure 2:
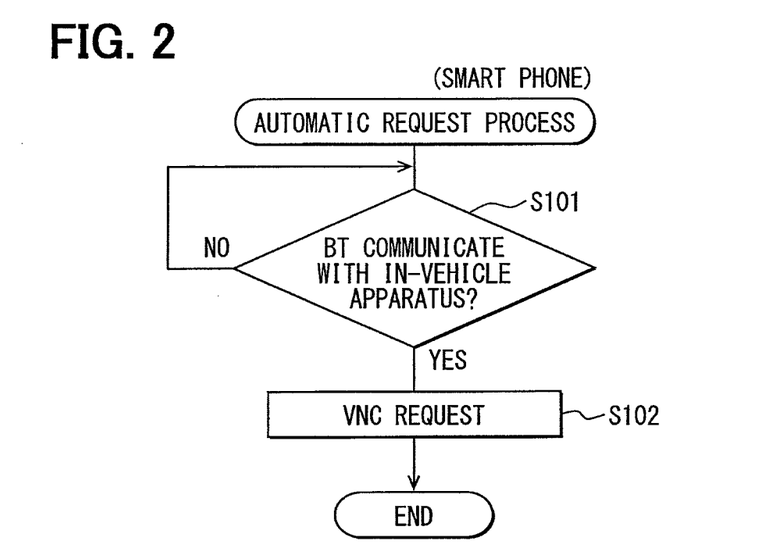
FIG. 2 is a flowchart of an automatic request process executed by a control portion of a registered smart phone.

The following explains a specific process procedure executed in the in-vehicle apparatus 1 and the registered smart phone 2. FIG. 2 is a flowchart of an automatic request process executed by the control portion 26 of a registered smart phone 2.

It is further noted that a flowchart or the processing of the flowchart in the present application includes sections (also referred to as steps), which are represented, for instance, as S101. Further, each section can be divided into several sub-sections while several sections can be combined into a single section. Furthermore, each of thus configured sections can be also referred to as a device, module, or means.

Furthermore, each or some combinations of thus configured sections can be achieved not only (i) as a software section in combination with a hardware unit (e.g., computer), but also (ii) as a hardware section, including or not including a function of a related apparatus. Further, the hardware section may be inside of a microcomputer.

Furthermore, the software section may be included in a software program, which may be contained in a non-transitory computer-readable storage media as a program product.

The control portion 26 starts an automatic request process in FIG. 2. At S101, it is determined whether a communication connection with the in-vehicle apparatus 1 is established via the BT wireless communication. When it is determined that the communication connection with the in-vehicle apparatus 1 is established via the BT wireless communication, the processing proceeds to S102, where the control portion 26 transmits a VNC request to the in-vehicle apparatus 1 via the BT communication portion 21. Then, the automatic request process in FIG. 2 ends. That is, the registered smart phone 2 transmits a VNC request automatically at the time when the communication connection is established with the in-vehicle apparatus 1 via the BT wireless communication. It is noted that the VNC request is to be transmitted automatically regardless of the user's intention (even if any manipulation is not performed by the user), and is also referred to as "automatic VNC request."

Figure 3:
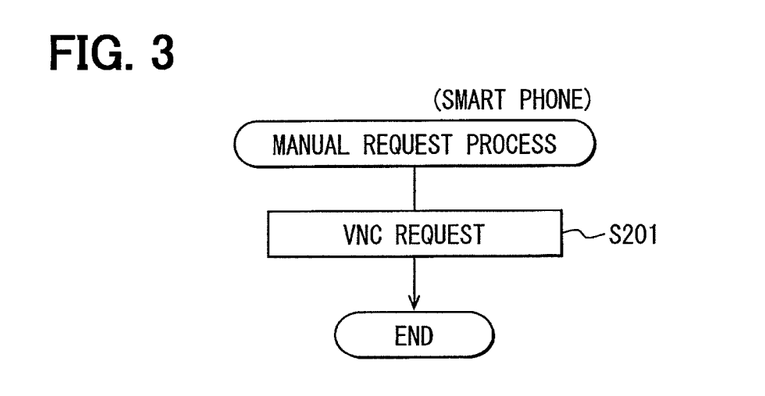
FIG. 3 is a flowchart of a manual request process executed by a control portion of a registered smart phone.

FIG. 3 is a flowchart of a manual request process executed by the control portion 26 when the above mentioned manipulation for VNC request is performed in a registered smart phone 2. The control portion 26 starts a manual request process in FIG. 3. At S201, the control portion 26 transmits a VNC request to the in-vehicle apparatus 1 via the BT communication portion 21. Then, the manual request process in FIG. 3 ends. That is, the registered smart phone 2 transmits a VNC request at the time when a manipulation for a VNC request is performed by a user. It is noted that the VNC request is to be transmitted manually according to the user's intention (manipulation performed by the user), and is also referred to as "manual VNC request." The automatic VNC request and the manual VNC request can be distinguishable from each other by the in-vehicle apparatus 1.

Figure 4:
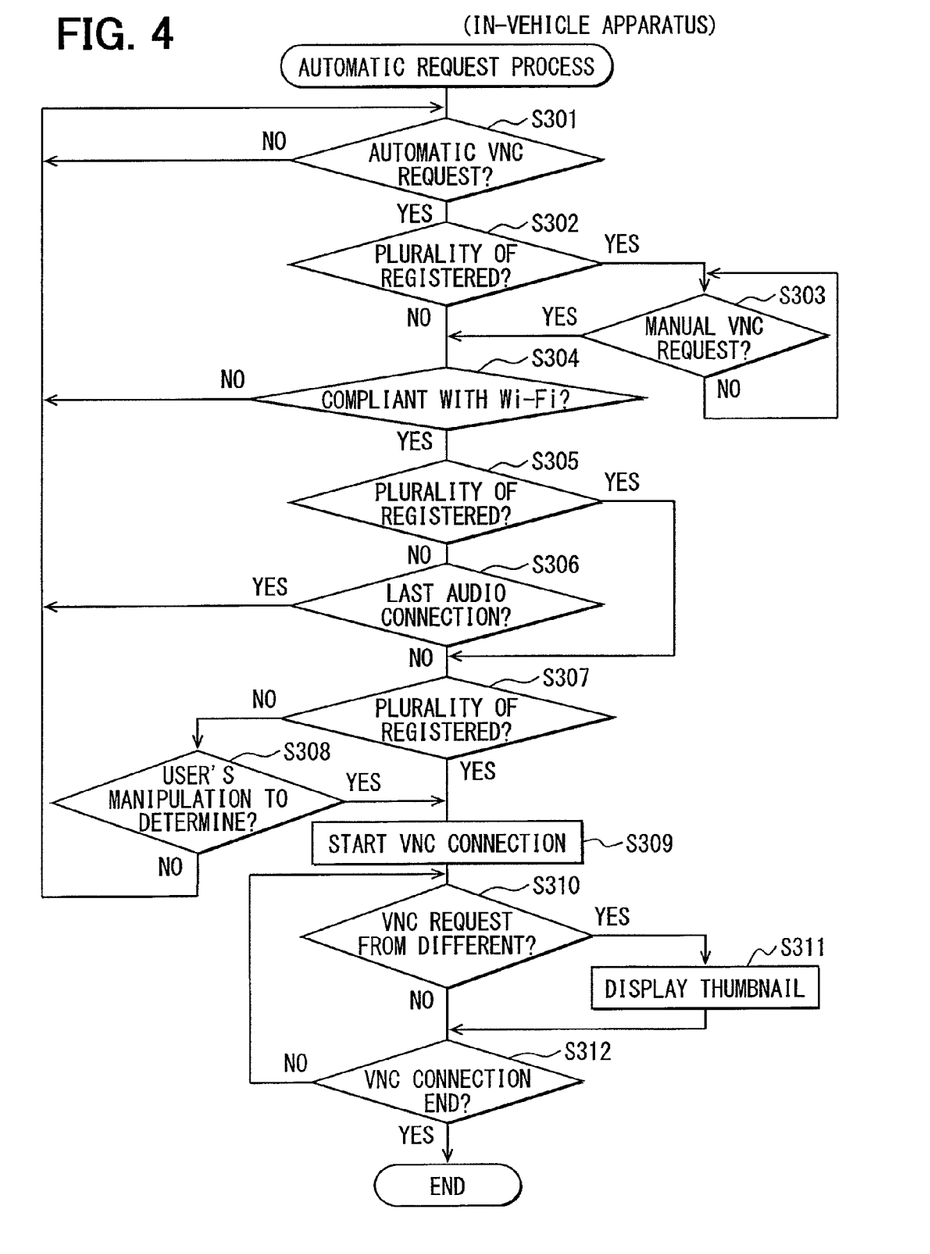
FIG. 4 is a flowchart of a connection process executed by a control portion of an in-vehicle apparatus.

FIG. 4 is a flowchart of a connection process executed by the control portion 15 of the in-vehicle apparatus 1. The control portion 15 starts a connection process in FIG. 4. At S301, it is determined whether an automatic VNC request is received from a registered smart phone 2 via the BT communication portion 11 (i.e., it is monitored whether an automatic VNC request is present or not), and monitoring is continued until receiving an automatic VNC request. Then, when it is determined at S301 that an automatic VNC request is received, the processing proceeds to S302, where it is determined whether a plurality of registered smart phones 2 are existing or not (whether a plurality of smart phones 2 are registered or not).

When it is determined at S302 that a plurality of registered smart phones 2 are existing, the processing proceeds to S303, where it is determined whether a manual VNC request is received from the registered smart phone 2 which is the transmission source of the automatic VNC request. When it is determined that a manual VNC request is received, the processing proceeds to S304. Further, when a manual VNC is not received until a predetermined time elapses, the processing may be returned to S301.

In contrast, when it is determined at S302 that a plurality of registered smart phones 2 are not existing (that only one smart phone 2 is registered), the processing proceeds to S304 directly. That is, when only one smart phone 2 is registered, the processing proceeds to S304 without waiting for reception of a manual VNC request. This example indicates the case of determining whether to execute the processing at S303 depending on the number of registered smart phones 2. Alternatively, the processing at S303 may be executed regardless of the number of registered smart phones 2 (even in the case that only one registered smart phone 2 is existing).

At S304, the control portion 15 determines whether the registered smart phone 2 being the transmission source of the automatic VNC request is compliant with the WF wireless communication (WF wireless communication is enabled). When it is determined at S304 that it is not compliant with the WF wireless communication, the processing returns to S301. This is because the control portion 15 cannot (i) receive any image signal from the registered smart phone 2 which is not compliant with the WF wireless communication and thereby (ii) establish the VNC connection. Further, the above determination can be achieved by registering presence or absence of a Wi-Fi communication portion 22 of a smart phone 2 when the smart phone 2 is registered as a registered smart phone 2, for example.

In contrast, when it is determined at S304 that the registered smart phone 2 being the transmission source is compliant with the WF wireless communication, the processing proceeds to S305. Like S302, at S305, it is determined whether a plurality of registered smart phones 2 are existing or not (whether a plurality of smart phones 2 are registered or not).

When it is determined at S305 that a plurality of registered smart phones 2 are not existing (that only one smart phone 2 is registered), the processing proceeds to S306. At S306, the control portion 15 determines whether a form of a communication connection executed at the last time with the registered smart phone 2 being the transmission source of the automatic VNC request is a form of a communication connection (audio connection) that receives a sound signal instead of receiving an image signal. It is noted that the audio connection is a connection form (a sound manipulation process including the above mentioned sound output process); this connection form is distinguished from the VNC connection in the following. That is, the connection form is used for permitting a speaker of a vehicle to output music reproduced by a sound reproduction function of the smart phone 2, and does not need of receiving an image signal (i.e., does not include the above mentioned image display process). The control portion 15 can establish such audio connection by replacing the VNC connection.

It is determined at S306 that the form of the communication connection executed at the last time with the registered smart phone 2 being the transmission source of the automatic VNC request is the audio connection, the processing returns to S301. In this case, the audio connection is started by replacing the VNC connection.

In contrast, it is determined at S306 that the form of the communication connection executed at the last time with the registered smart phone 2 being the transmission source of the automatic VNC request is not the audio connection (namely, that the form is the VNC connection), the processing proceeds to S307. In addition, when it is determined at S305 that a plurality of registered smart phones 2 are existing, the processing also proceeds to S307 directly. It is noted that this example indicates the case of determining whether to execute the processing at S306 depending on the number of registered smart phones 2. Alternatively, the processing at S306 may be executed regardless of the number of registered smart phones 2 (even in the case that a plurality of registered smart phone 2 are existing).

Like S302 or S305, at S307, it is determined whether a plurality of registered smart phones 2 are existing or not (whether a plurality of smart phones 2 are registered or not). When it is determined at S307 that a plurality of registered smart phones 2 are not existing (that only one smart phone 2 is registered), the processing proceeds to S308, where an inquiry is presented to the user whether to start a VNC connection. To be specific, the control portion 15 receives temporarily an image signal from the registered smart phone 2 being the transmission source of the automatic VNC request; the image signal indicates an image currently displayed on the display portion 23 of that registered smart phone 2. Thereby, the control portion 15 performs a simple display of an image representing the image signal (for instance, the simple display performs a display of the image on a part of the display screen of the touch panel display portion 13 as a thumbnail image). Then, a message such as "is this smart phone screen to be displayed?" is displayed, thereby requiring the user to perform a manipulation that determines whether to start the VNC connection.

When it is determined at S308 that the manipulation is performed which selects not starting of the VNC connection, the processing returns to S301. When it is determined at S308 that the manipulation is performed which selects starting of the VNC connection, the processing proceeds to S309. In addition, when it is determined at S307 that a plurality of registered smart phones 2 are existing, the processing also proceeds to S309. This example indicates the case of determining whether to execute the processing at S308 depending on the number of registered smart phones 2. Alternatively, the processing at S308 may be executed regardless of the number of registered smart phones 2 (even in the case that a plurality of registered smart phone 2 are existing).

At S309, the control portion 15 starts the VNC connection with the registered smart phone 2 which is the transmission source of the automatic VNC request. Then, at S310, the control portion 15 determines whether a VNC request is received from a registered smart phone 2 different from the registered smart phone 2 being currently connected under the VNC connection. To be specific, when both the automatic VNC request and the manual VNC request are received, it is determined that the VNC request is received. The basis of determining that the VNC request is received need not be limited to the above. For example, when an automatic VNC request is received (even when a manual VNC request is not received), it may be determined that the VNC request is received.

Then, when it is determined at S310 that a VNC request is received from a different registered smart phone 2, the processing proceeds to S311. At S311, a simple display representing the different registered smart phone 2 being the source of the request is performed in the touch panel display portion 13 (for instance, the simple display is performed in an end portion of the display screen). The processing then proceeds to S312. The simple display displays an image (an image indicating the different registered smart phone 2 being the source of the request); the image may include a thumbnail image of an image displayed in the display portion 23 of the different registered smart phone 2. That is, the control portion 15 receives an image signal from the different registered smart phone 2 being the source of the request; the image signal indicates an image currently displayed on the display portion 23 of the different registered smart phone 2. Thereby, the control portion 15 displays an image indicated by the image signal in an end portion or the like of the display screen of the touch panel display portion 13 as a thumbnail image. It is noted that the image indicating the different registered smart phone 2 of the source of the request need not be limited to a thumbnail image. For example, in the state where the thumbnail image cannot be displayed, other images may be used as a substitute image as follows: an image indicating the kind (model etc.) of the different registered smart phone 2 of the source of the request; or an image associated when the different registered smart phone 2 is registered as a candidate of the VNC connection (an icon associated with each registered smart phone 2). Thus, the fact that the VNC request is received from a different registered smart phone 2 is displayed in the touch panel display portion 13; this enables the user (for example, driver) to determine whether to switch the registered smart phone 2 for the VNC connection.

In contrast, when it is determined at S310 that the VNC request is not received from a different registered smart phone 2, the processing proceeds to S312 directly.

At S312, the control portion 15 determines whether the VNC connection is ended. For instance, when a manipulation is performed which ends the VNC connection in either the touch panel display portion 13 of the in-vehicle apparatus 1 or the display portion 23 of the registered smart phone 2, or when the registered smart phone 2 is turned off, it is determined that the VNC connection is ended. When it is determined at S312 that the VNC connection is not ended, the processing returns to S310 to continue the VNC connection. When it is determined that the VNC connection is ended, the connection process in FIG. 4 is ended.

4. Advantageous Effect

As explained above, under the wireless communication system according to the present embodiment, a smart phone 2 transmits an automatic VNC request automatically (S102) based on a trigger event that arises when the communication connection is established with the in-vehicle apparatus 1 via the BT wireless communication (S101: YES). Further, the smart phone 2 transmits a manual VNC request at the time when a manipulation for VNC request is performed by a user (S201). In contrast, the in-vehicle apparatus 1 uses, as a start condition of starting a VNC connection, the reception of a request of the VNC connection from a registered smart phone 2 (S301). In other words, the reception of a request of the VNC connection from a registered smart phone 2 satisfies a start condition of starting a VNC connection. Further, in particular, when a plurality of smart phones 2 each are registered as a registered smart phone 2 (S302: YES), the reception of a manual VNC request from a registered smart phone 2 is also used for the start condition as well as the automatic VNC request (S303). In other words, the reception of two requests of an automatic VNC request and a manual VNC request from a registered smart phone 2 satisfies a start condition of starting a VNC connection with the registered smart phone 2.

According to the above wireless communication system, when a plurality of smart phones 2 are registered as a registered smart phone 2, the in-vehicle apparatus 1 can determine a registered smart phone 2, which a manipulation for a VNC request is performed to, as a target of the VNC connection. This leads to elimination of necessity of selecting one among a plurality of candidates in a configuration where a registered smart phone 2 that is a target of the VNC connection is selected by a manipulation to the in-vehicle apparatus 1. Thus, the efficient determination is enabled for determining the smart phone 2 serving as a target of the VNC connection.

In addition, in the in-vehicle apparatus 1 according to the present embodiment, when a plurality of registered smart phones 2 are not existing (when only one registered smart phone 2 is existing), a manipulation of the VNC request is not used for the start condition (S302: NO). Thus, as long as a user enters a vehicle together with a smart phone 2 enabled to perform the BT wireless communication, the smart phone 2 can simply transitions into the state of the VNC connection with the in-vehicle apparatus 1.

In addition, in the in-vehicle apparatus 1 according to the present embodiment, that a registered smart phone 2 is compliant with the WF wireless communication (compliant with the VNC connection) is also used for the start condition (S304). This can prevent the execution of the VNC connection to the smart phone 2 being not compliant with the VNC connection.

In addition, in the in-vehicle apparatus 1 according to the present embodiment, when the last communication connection form with the registered smart phone 2 is an audio connection (S306: YES), the sound manipulation process is executed by replacing the VNC connection. This can help prevent the VNC connection from unintentionally starting although the user desires the start of the audio connection.

In addition, in the in-vehicle apparatus 1 according to the present embodiment, the user is required to perform a manipulation for starting the VNC connection before starting the VNC connection (S308). The user can thus prevent the start of the VNC connection when not wanting the execution of the VNC connection. In particular, suppose that only a single registered smart phone is existing. In such a case, when the smart phone 2 carried by the user enters the vehicle, the smart phone 2 is easily enabled to be in the VNC connection with the in-vehicle apparatus 1. Thus, it is supposed that the VNC connection may be established against the user's intention. It is thus effective to require the user to perform a manipulation to start the VNC connection.

In addition, in the in-vehicle apparatus 1 according to the present embodiment, the following takes place. Even if a request of a VNC connection is received from a different registered smart phone 2 while the VNC connection with a subject registered smart phone 2 is executed (S310: YES), the VNC connection with the different registered smart phone 2 being the source of the request is not started while a thumbnail image of an image currently displayed on the display portion 23 of the different registered smart phone 2 is displayed (S311). This can help prevent the VNC request from the different registered smart phone 2 from interfering with the VNC connection under execution. Further, the user can visually recognize from which user's smart phone 2 the VNC request is issued, and simultaneously the issuance of the VNC request from the different registered smart phone 2 based on the displayed thumbnail image.

Further, the BT communication portion 11 and the Wi-Fi communication portion 12 may be referred to as an in-vehicle communication portion, an in-vehicle communication device, or an in-vehicle communication means. The touch panel display portion 13 may be referred to as (i) an in-vehicle display portion, an in-vehicle display device, or an in-vehicle display means, or (ii) an in-vehicle input portion, an in-vehicle input device, or an in-vehicle input means. The sound output portion 14 may be referred to as an in-vehicle sound output portion, an in-vehicle sound output device, or an in-vehicle sound output means. The control portion 15 may be referred to as a control apparatus. In addition, the connection process by the control portion 15 may be referred to as an execution section, an execution device, or an execution means. In addition, the processing at S304 by the control portion 15 may be referred to as a determination section, a determination device, or a determination means.

In addition, the smart phone (registered smart phone) 2 may be referred to as a portable apparatus (registered portable apparatus) or a terminal being portable. Further, the BT communication portion 21 and the Wi-Fi communication portion 22 may be referred to as a portable communication portion, a portable communication device, or a portable communication means. The display portion 23 may be referred to as a terminal display portion, a terminal display device, or a terminal display means. The manipulation portion 24 may be referred to as a terminal input portion, a terminal input device, or a terminal input means. In addition, the VNC request in the automatic request process by the control portion 26 may be referred to as a first remote manipulation request. In addition, the processing at S102 by the control portion 26 may be referred to as a first request section, a first request device, or a first request means. In addition, the VNC request in the manual request process by the control portion 26 may be referred to as a second remote manipulation request. In addition, the processing at S201 by the control portion 26 may be referred to as a second request section, a second request device, or a second request means.

5. Other Embodiments

Although the embodiment is explained above, the present disclosure is not limited to the embodiment and can be modified in various manners.

(1) The above embodiment provides an example that performs a VNC connection for the in-vehicle apparatus 1 to remotely manipulate the smart phone 2; however, the technique of the remote manipulation is not limited to a specific one. For example, another configuration may be provided which performs the remote manipulation based on a terminal mode of an interface standard that enables a cooperation between an in-vehicle information terminal and a portable terminal. In short, a configuration of an in-vehicle apparatus 1 is required only to execute (i) an image display process which receives an image displayed in a display portion of a portable apparatus via the wireless communication portion, thereby displaying the received image on the display portion of the in-vehicle apparatus; and (ii) a manipulation output process which receives a manipulation inputted via an input portion of the in-vehicle apparatus and outputs the received manipulation to a portable apparatus via a wireless communication portion of the in-vehicle apparatus.

(2) The above embodiment describes a smart phone that exemplifies a portable apparatus or a terminal that is portable. A mobile phone other than the smart phone may exemplify the portable apparatus or the terminal being portable. In addition, a portable apparatus (for example, a tablet terminal) other than those may also exemplify it.

(3) The control apparatus of the present disclosure may be configured to be a part (chip module) of the control portion 15.

Although one aspect of the present disclosure has been already described in "Summary of Invention", optional aspects in the aspect are set forth below.

For example, according to an optional aspect of the present disclosure, in cases that the at least one terminal includes a single registered terminal that is registered as the target of the remote manipulation process, the execution section may not define a manipulation, which requests the remote manipulation process, as the start condition of starting the remote manipulation process, wherein the manipulation is received by an input portion of the single registered terminal.

Even when a plurality of portable apparatuses are not registered as a registered portable apparatus (i.e., when only a single portable apparatus is registered), the manipulation performed in a manipulation portion of a registered portable apparatus in order to request a remote manipulation process may be defined as a start condition, as in the case of a plurality of portable apparatuses are registered. However, in order to lessen manipulations necessary for starting the remote manipulation process, the above configuration of the optional aspect may be preferred. Under the above configuration of the optional aspect, when a single portable apparatus is registered as a registered portable apparatus, the determination of the registered portable apparatus being a target of the remote manipulation process does not need any manipulation in the portable apparatus.

Further, according to an optional aspect of the present disclosure, during an execution of the remote manipulation process a target of which is the one of the more than one registered terminal, the execution section may not start the remote manipulation process a target of which is a different registered terminal other than the one of the more than one registered terminal.

When a plurality of portable apparatuses each are registered as a registered portable apparatus, a request of the remote manipulation process may be transmitted from a different registered portable apparatus during an execution of the remote manipulation process a target of which is a subject registered terminal. If the remote manipulation process is executed for the different registered portable apparatus according to the request, an interference with the remote manipulation process already executed for the subject registered terminal may arise. To that end, the above configuration of the optional aspect can help prevent the request of the remote manipulation process from the different registered smart phone from interfering with the remote manipulation process under execution.

Further, under the above configuration, when receiving a request of the remote manipulation process from a requester, which is the different registered terminal among the more than one registered terminal, via the in-vehicle wireless communication portion during the execution of the remote manipulation process the target of which is the one of the more than one registered terminal, the execution section may cause the in-vehicle display portion to display an image relating to the requester as a part of a displayed image.

It may be preferred that the target of the remote manipulation process is switched into the different registered portable apparatus. To that end, according to the above configuration, the user can recognize that the reception of a request of the remote manipulation process from a different registered portable apparatus based on the image displayed in the in-vehicle display portion. As a result, the target of the remote manipulation process can be switched as needed.

Further, under the above configuration, the execution section may receive an image displayed in a display portion of the requester via the in-vehicle wireless communication portion, and cause the in-vehicle display portion to display the received image as the image relating to the requester.

This configuration enables the user to recognize visually the registered portable apparatus which is the requester of the remote manipulation process.

Further, according to an optional aspect of the present disclosure, the wireless communication portion may perform as the wireless communication with the at least one terminal a Bluetooth communication compliant with a Bluetooth communication standard. A registered terminal, which is registered as a target of the remote manipulation process, may transmit a request of the remote manipulation process to the in-vehicle apparatus based on a trigger event that arises when the registered terminal transitions into a state where the registered terminal is enabled to perform the Bluetooth communication with the in-vehicle apparatus.

Such a configuration enables the user to transmit a request of the remote manipulation process to the in-vehicle apparatus only by causing a portable apparatus to remain in the state permitting the BT wireless communication.

Further, according to an optional aspect of the present disclosure, the in-vehicle apparatus may further include an in-vehicle sound output portion to output a sound. The execution section may include a sound output process, which receives a sound outputted in a sound output portion of the at least one terminal via the in-vehicle wireless communication portion and outputs the received sound in the in-vehicle sound output portion. The execution section may be enabled to perform a sound manipulation process, which does not include the image display process, as a substitute of the remote manipulation process. When a process, which was performed at the last time for the registered terminal, is the sound manipulation process, the execution section may not perform the remote manipulation process for the registered terminal.

Such a configuration can help prevent the remote manipulation process from being executed although the user desires an execution of the sound output process.

Further, according to an optional aspect of the present disclosure, a determination section may be further included which performs a compliance determination as to whether a registered terminal that is registered as a target of the remote manipulation process is compliant with the remote manipulation process. The execution section may regard, as the start condition, the compliance determination affirmed by the determination section in addition.

A portable apparatus that is not compliant with the remote manipulation process may be registered as a registered portable apparatus. Thus, the above configuration can prevent the execution of the remote manipulation process the target of which is the portable apparatus that is not compliant with the remote manipulation process.

Further, according to an optional aspect of the present disclosure, the execution section may request a user of the in-vehicle apparatus to perform a start manipulation of starting the remote manipulation process before starting the remote manipulation process.

There is a case that a remote manipulation process is executed although the user does not desire the execution of the remote manipulation process. The above configuration enables the user to prevent the start of the remote manipulation process when not wanting the execution of the remote manipulation process.

While the present disclosure has been described with reference to preferred embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A control apparatus that performs, in an in-vehicle apparatus, a remote manipulation process to remotely manipulate at least one terminal being portable,
the in-vehicle apparatus including an in-vehicle display portion to display an image, an in-vehicle input portion to receive a manipulation, and an in-vehicle wireless communication portion to perform a wireless communication with the at least one terminal,
the control apparatus comprising:
an execution processor configured to perform, as the remote manipulation process, an image display process and a manipulation output process,
the image display process being a process that receives an image displayed in a display portion of the at least one terminal via the in-vehicle wireless communication portion and displays the received image in the in-vehicle display portion, the manipulation output process being a process that outputs a manipulation, which is received by the in-vehicle input portion, to the at least one terminal via the in-vehicle wireless communication portion, wherein:

in cases that the at least one terminal includes a single registered terminal that is registered as a target of the remote manipulation process, the execution processor starts the remote manipulation process on a start condition that is fulfilled when receiving a request of the remote manipulation process from the single registered terminal via the in-vehicle wireless communication portion, the request being transmitted by the single registered terminal based on and following the wireless communication having being established between the in-vehicle wireless communication portion and the single registered terminal; and in cases that the at least one terminal includes more than one registered terminal that is registered as a target of the remote manipulation process, the execution processor starts the remote manipulation process on a start condition that is fulfilled when receiving a first request of the remote manipulation process and a second request of the remote manipulation process following the first request, the first request being transmitted by one of the more than one registered terminal based on and following the wireless communication having being established between the in-vehicle wireless communication portion and the one of the more than one registered terminal, the second request being transmitted by the one of the more than one registered terminal based on and following a manipulation via an input portion of the one of the more than one registered terminal following the first request.

2. The control apparatus according to claim 1, wherein during an execution of the remote manipulation process a target of which is the one of the more than one registered terminal, the execution section does not start the remote manipulation process a target of which is a different registered terminal other than the one of the more than one registered terminal.

3. The control apparatus according to claim 2, wherein when receiving a request of the remote manipulation process from a requester, which is the different registered terminal among the more than one registered terminal, via the in-vehicle wireless communication portion during the execution of the remote manipulation process the target of which is the one of the more than one registered terminal, the execution section causes the in-vehicle display portion to display an image relating to the requester as a part of a displayed image.

4. The control apparatus according to claim 3, wherein the execution section receives an image displayed in a display portion of the requester via the in-vehicle wireless communication portion, and causes the in-vehicle display portion to display the received image as the image relating to the requester.

5. The control apparatus according to claim 1, wherein:

the wireless communication portion performs as the wireless communication with the at least one terminal a Bluetooth communication compliant with a Bluetooth communication standard; and a registered terminal, which is registered as a target of the remote manipulation process, transmits a request of the remote manipulation process to the in-vehicle apparatus based on a trigger event that arises when the registered terminal transitions into a state where the registered terminal is enabled to perform the Bluetooth communication with the in-vehicle apparatus.

6. The control apparatus according to claim 1, wherein:

the in-vehicle apparatus further includes an in-vehicle sound output portion to output a sound;

the execution section includes a sound output process, which receives a sound outputted in a sound output portion of the at least one terminal via the in-vehicle wireless communication portion and outputs the received sound in the in-vehicle sound output portion;

the execution section is enabled to perform a sound manipulation process, which does not include the image display process, as a substitute of the remote manipulation process; and when a process, which was performed at a last time for the registered terminal, is the sound manipulation process, the execution section does not perform the remote manipulation process for the registered terminal.

7. The control apparatus according to claim 1, further comprising:

a determination processor configured to perform a compliance determination as to whether a registered terminal that is registered as a target of the remote manipulation process is compliant with the remote manipulation process, wherein the execution processor regards, as the start condition, the compliance determination affirmed by the determination processor in addition.

8. The control apparatus according to claim 1, wherein the execution section requests a user of the in-vehicle apparatus to perform a start manipulation of starting the remote manipulation process before starting the remote manipulation process.

9. A wireless communication system including at least one terminal being portable and an in-vehicle apparatus, the at least one terminal comprising:

a terminal display portion to display an image;

a terminal input portion to receive a manipulation; and a terminal wireless communication portion to perform a wireless communication with the in-vehicle apparatus, wherein when the at least one terminal includes a registered terminal that is previously registered as a target of the remote manipulation process, the registered terminal includes a manipulation processor configured to transmit a first remote manipulation request via the terminal wireless communication portion to the in-vehicle apparatus based on and following the wireless communication having been established between the terminal wireless communication portion of the registered terminal and the in-vehicle apparatus, and transmit a second remote manipulation request via the terminal wireless communication portion to the in-vehicle apparatus when a manipulation that requests a remote manipulation is received by the terminal input portion after the first remote manipulation request is transmitted by the manipulation processor, the in-vehicle apparatus comprising:

an in-vehicle display portion to display an image;

an in-vehicle input portion to receive a manipulation; an in-vehicle wireless communication portion to perform a wireless communication with the at least one terminal; and an execution processor configured to perform, as a remote manipulation process to remotely manipulate the at least one terminal, an image display process and a manipulation output process, the image display process being a process, which receives an image displayed in the terminal display portion via the in-vehicle wireless communication portion and displays the received image in the in-vehicle display portion, the manipulation output process being a process that outputs a manipulation, which is received by the in-vehicle input portion, to the at least one terminal via the in-vehicle wireless communication portion, wherein:

in cases that the at least one terminal includes a single registered terminal that is registered as a target of the remote manipulation process, the execution processor starts the remote manipulation process on a start condition that is fulfilled when receiving the first remote manipulation request from the single registered terminal via the in-vehicle wireless communication portion, the single request being transmitted by the single registered terminal based on and following the wireless communication having being established between the in-vehicle wireless communication portion and the single registered terminal; and in cases that the at least one terminal includes more than one registered terminal that is registered as a target of the remote manipulation process, the execution processor starts the remote manipulation process on a start condition that is fulfilled when receiving the first remote manipulation request and the second remote manipulation request following the first remote manipulation request, the first remote manipulation request being transmitted by one of the more than one registered terminal based on and following the wireless communication having being established between the in-vehicle wireless communication portion and the one of the more than one registered terminal, the second remote manipulation request being transmitted by the one of the more than one registered terminal based on and following the manipulation via the input portion of the one of the more than one registered terminal following the first remote manipulation request.

10. A control apparatus that performs, in an in-vehicle apparatus, a remote manipulation process to remotely manipulate at least one terminal being portable, the in-vehicle apparatus including an in-vehicle display portion to display an image, an in-vehicle input portion to receive a manipulation, and an in-vehicle wireless communication portion to perform a wireless communication with the at least one terminal, the control apparatus comprising:

an execution processor that performs, as the remote manipulation process, an image display process and a manipulation output process, the image display process being a process that receives an image displayed in a display portion of the at least one terminal via the in-vehicle wireless communication portion and displays the received image in the in-vehicle display portion, the manipulation output process being a process that outputs a manipulation, which is received by the in-vehicle input portion, to the at least one terminal via the in-vehicle wireless communication portion, wherein:

the execution processor defines, as a start condition of starting the remote manipulation process, a reception of a request of the remote manipulation process from a registered terminal, which is included in the at least one terminal and registered as a target of the remote manipulation process, via the in-vehicle wireless communication portion;

in cases that the at least one terminal includes more than one registered terminal that is registered as the target of the remote manipulation process, the execution processor defines, as the start condition, a manipulation that requests the remote manipulation process in addition, the manipulation being received by an input portion of one of the more than one registered terminal;

during an execution of the remote manipulation process a target of which is the one of the more than one registered terminal, the execution processor does not start the remote manipulation process a target of which is a different registered terminal other than the one of the more than one registered terminal; and when receiving a request of the remote manipulation process from a requester, which is the different registered terminal among the more than one registered terminal, via the in-vehicle wireless communication portion during the execution of the remote manipulation process the target of which is the one of the more than one registered terminal, the execution processor causes the in-vehicle display portion to display an image relating to the requester as a part of a displayed image.

11. The control apparatus according to claim 10, wherein the execution processor receives an image displayed in a display portion of the requester via the in-vehicle wireless communication portion, and causes the in-vehicle display portion to display the received image as the image relating to the requester.

12. A control apparatus that performs, in an in-vehicle apparatus, a remote manipulation process to remotely manipulate at least one terminal being portable, the in-vehicle apparatus including an in-vehicle display portion to display an image, an in-vehicle input portion to receive a manipulation, and an in-vehicle wireless communication portion to perform a wireless communication with the at least one terminal, the control apparatus comprising:

an execution processor that performs, as the remote manipulation process, an image display process and a manipulation output process, the image display process being a process that receives an image displayed in a display portion of the at least one terminal via the in-vehicle wireless communication portion and displays the received image in the in-vehicle display portion, the manipulation output process being a process that outputs a manipulation, which is received by the in-vehicle input portion, to the at least one terminal via the in-vehicle wireless communication portion, wherein:

the execution processor defines, as a start condition of starting the remote manipulation process, a reception of a request of the remote manipulation process from a registered terminal, which is included in the at least one terminal and registered as a target of the remote manipulation process, via the in-vehicle wireless communication portion;

in cases that the at least one terminal includes more than one registered terminal that is registered as the target of the remote manipulation process, the execution processor defines, as the start condition, a manipulation that requests the remote manipulation process in addition, the manipulation being received by an input portion of one of the more than one registered terminal;

the in-vehicle apparatus further includes an in-vehicle sound output portion to output a sound;

the execution processor includes a sound output process, which receives a sound outputted in a sound output portion of the at least one terminal via the in-vehicle wireless communication portion and outputs the received sound in the in-vehicle sound output portion;

the execution processor is enabled to perform a sound manipulation process, which does not include the image display process, as a substitute of the remote manipulation process; and when a process, which was performed at a last time for the registered terminal, is the sound manipulation process, the execution processor does not perform the remote manipulation process for the registered terminal.

* * * * *